US011544649B2

(12) United States Patent
Tomita et al.

(10) Patent No.: US 11,544,649 B2
(45) Date of Patent: Jan. 3, 2023

(54) ELECTRIC VEHICLES OPERATION MANAGEMENT EQUIPMENT

(71) Applicant: Hitachi, Ltd., Tokyo (JP)

(72) Inventors: Yasushi Tomita, Los Altos, CA (US); Bo Yang, Santa Clara, CA (US); Panitarn Chongfuangprinya, San Jose, CA (US); Yanzhu Ye, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 965 days.

(21) Appl. No.: 16/276,001

(22) Filed: Feb. 14, 2019

(65) Prior Publication Data
US 2020/0262306 A1    Aug. 20, 2020

(51) Int. Cl.
*G06Q 10/00*       (2012.01)
*B60L 53/00*       (2019.01)
*G06Q 10/06*       (2012.01)
*B60L 53/67*       (2019.01)
*B60L 53/66*       (2019.01)

(52) U.S. Cl.
CPC ........ *G06Q 10/06315* (2013.01); *B60L 53/66* (2019.02); *B60L 53/67* (2019.02); *B60Y 2200/91* (2013.01)

(58) Field of Classification Search
CPC .............................................. G06Q 10/06315
See application file for complete search history.

(56) References Cited

U.S. PATENT DOCUMENTS

| 9,043,038 B2 | 5/2015 | Kempton | |
| 2012/0271547 A1* | 10/2012 | Mori | G01C 21/3679 |
| | | | 701/527 |
| 2013/0211988 A1* | 8/2013 | Dorn | G08G 1/20 |
| | | | 700/297 |
| 2014/0257884 A1* | 9/2014 | Kyoung | G06Q 10/02 |
| | | | 705/5 |
| 2015/0298565 A1 | 10/2015 | Iwamura et al. | |

OTHER PUBLICATIONS

W. Shuai, P. Maillé and A. Pelov, "Charging Electric Vehicles in the Smart City: A Survey of Economy-Driven Approaches," in IEEE Transactions on Intelligent Transportation Systems, vol. 17, No. 8, pp. 2089-2106, Aug. 2016, doi: 10.1109/TITS.2016.2519499. (Year: 2016).*
Extended European Search Report for related European Application No. 20154592.8 dated Jun. 26, 2020 (7 pages).

* cited by examiner

*Primary Examiner* — Hafiz A Kassim
*Assistant Examiner* — Matheus Ribeiro Stivaletti
(74) *Attorney, Agent, or Firm* — Procopio, Cory, Hargreaves & Savitch LLP

(57) ABSTRACT

Example implementations described herein are directed to managing the operation of a plurality of electric vehicles (EVs) for transportation service, power system operating reserve service and operation planning, which is utilized to determine whether to use each EV for transportation travel or power system operating reserve supply for a given time period and location. Such management allows for the increase of the total operation value by transportation travel and power system operation reserve supply.

15 Claims, 10 Drawing Sheets

|  |  | EV # | | | |
|---|---|---|---|---|---|
|  |  | C1 | C2 | C3 | ..... |
| Time period | [T1]<br>9:00<br>-<br>9:15 | EVOC = Transportation service<br>EVLO = TARL2<br>SOCB = 70 [%]<br>SOCR = 10 [%] | | | |
| | [T2]<br>9:15<br>-<br>9:30 | EVOC = Operating reserve service<br>EVLO = CDFL3<br>SOCB = 10 [%]<br>SOCR = 50 [%] | | | |
| | ⋮ | | | | |
| | [T96]<br>8:45<br>-<br>9:00 | EVOC = Operating reserve service<br>EVLO = CDFL3<br>SOCB = 10 [%]<br>SOCR = 50 [%] | | | |

FIG. 2

ELECTRIC VEHICLES OPERATION MANAGEMENT EQUIPMENT

BACKGROUND

Field

The present disclosure relates generally to electric vehicles, and more specifically to management equipment for power systems and for electric vehicle operation.

Related Art

For operating electric power systems, it can be necessary to maintain a balance between supply and demand of electric power. However, electric power consumption by end-users and electric power generation by renewable energy fluctuate independently and result in uncertainty. To stably operate electric power systems, it can be necessary to fill such gaps by adjusting power generation amount and demand amount at any given time.

In related art systems, the power generation amount is adjusted by controlling thermal power plants, and the demand amount is adjusted by adjusting electric equipment usage. Such related art methods of adjusting supply-demand gap is known as "power system operating reserves" (hereinafter "operating reserve"). In recent times, expansion of the operating reserves can be an issue in the spread of wind power generation and photovoltaic power generation, because wind power generation and photovoltaic power generation fluctuate uncertainly in accordance with fluctuation in natural energy.

In expanding the operating reserves, there has been much implementation for spreading electric vehicles (EVs). Batteries of EVs which are not traveling and are connected to charging/discharging facilities are utilized as a resource for the operating reserve. Transportation service providers which operate a lot of EVs have the potential to provide a large operating reserve. However, the EVs cannot be utilized as operating reserve when they are running in operation. When power system needs operating reserve, if many EVs are running in operation and not connected to charging/discharging facilities, the amount of utilizable operating reserve is limited. Even when EVs are connected to charging/discharging facilities and utilized as an operating reserve, if the remaining charged amount of batteries of EVs is low, the operational value of EVs decreases because such EVs cannot run long distances and their intended use as an EV is reduced.

In a related art implementation involving methods to provide power system operating reserve, such implementations control power flow to/from power system by aggregating and managing multiple EVs and charge/discharge facilities. Such related art implementations consider operating parameters of each EV and charging/discharging facility, and distributes the total amount of power system operating reserve supply to them. The operating parameters includes the driving schedule and grid location of each EV. The idea facilitates utilization of the charge/discharge power potential of EVs for power system operating reserve while avoiding limitation on operational value of EVs.

Even in such related art implementations, there still exist cases where the charge/discharge power potential of EVs cannot be utilized for power system operating reserve. Even when some EV has charge/discharge power potential to supply operating reserve and the EV is not necessary to be used for transportation service, if there are not any charging/discharging facilities for the EV to connect, the EV cannot supply the operating reserve. Also, when the power system operating reserve is tight, the situation may increase the operational value of EVs by utilizing the EVs for operating reserve supply rather than for transportation travel. Such related art implementation may lose opportunity to increase total operational value of EVs.

SUMMARY

The problem to be solved is to utilize more the charge/discharge power potential of EVs as a resource for power system operating reserve while avoiding limiting the operational value of the EVs. Example implementations described herein are directed to systems and methods for utilizing the charge/discharge power potential of EVs for power system operating reserve as much as possible, while avoiding the limitation on operational value of EVs, in utilizing EVs for transportation service and power system operating reserve.

In transportation service and power system operating reserve services which utilize EVs and charging/discharging facilities, the EV operation management equipment as described herein manages the operation of one or more EVs transporting people or goods and one or more charging/discharging facilities used by those EVs. Example implementations involve the creation of an EV operation plan so that the total operation value by transportation travel and power system operating reserve supply can be increased. The total operation value is the amount obtained by subtracting the value consumed in traveling energy consumption from the value generated in transportation travel and power system operating reserve supply. That is, the features described herein involve deciding whether to use each EV for transportation travel or power system operating reserve supply at which time period and where.

The EVs operation management equipment described herein involve "data of EVs dispatch table" (hereinafter "EVDT"), "data of the number of acceptable EVs per charging/discharging facility" (hereinafter "NEVC per charging/discharging facility"), "means of EVs dispatch management" (hereinafter "EVDM") and "means of operating reserve service management" (hereinafter "ORSM") to create the EVs operation plan.

The EVDT involves the operation plan data of each EV for the next 24 hours. For each combination of EV and time period, "EV operation status" (hereinafter "EVOS"), "EV location" (hereinafter "EVLO") and "SOC reference at the end of the time period" (hereinafter "SOCR of the time period") are associated to the combination. For each combination of EV and the first time period, there is also SOC at the beginning of the first time period (hereinafter "SOCB of the first time period") associated to the combination. SOC indicates the ratio of the remaining charged electric power amount to the charged amount when the battery is fully charged. The EVOS is data indicating whether the EV is provided for "transportation service" (hereinafter "TRS"), "power system operating reserve service" (hereinafter "ORS") or "electric power charging" (hereinafter "EPC"). The EVLO is data indicating where the EV is located among the transportation service areas and charging/discharging facility locations. The SOCR is data indicating the reference value for SOC which the EV should satisfy at the end of a time period. The SOCB is data indicating the SOC of the EV at the beginning of a time period.

The NEVC per charging/discharging facility is data indicating the maximum number of EVs which can be charged/discharged at the same time from the charging/discharging facility.

The EVDM is a functional block which creates multiple EVDT candidates, evaluates the total operation values realized by each EVDT candidate, and selects the best EVDT having the highest operation value. EVDT candidates are created so that the number of EVs assigned to each charging/discharging facility at the same time is smaller than or equal to the NEVC of the charging/discharging facility.

The ORSM is a functional block which receives a notification of the operating reserve supply from the power system operation system, and creates a combination of instructions to change the charge/discharge power amount of each EV whose EVOS has the value of ORS so that the combination of instructions satisfies the charge/discharge power amount indicated by the notification of operating reserve supply as a total.

Aspects of the present disclosure involve a method, which can include receiving parameters from a plurality of electric vehicles (EVs), a plurality of charging facilities, a power system managing the plurality of charging facilities, and a transportation service system; determining EV dispatch instructions for the plurality of EVs, the instructions directing each of the plurality of EVs to conduct one of providing transportation service, charging at one or more of the plurality of charging facilities, and discharging to the one or more of the plurality of charging facilities, the EV dispatch instructions determined from a plurality of candidate dispatch instructions based on an operation value of the plurality of candidate dispatch instructions calculated from transportation service revenue, operating reserve supply revenue, and revenue consumed from EV travel, as determined from the parameters; and dispatching the EV dispatch instructions to the plurality of EVs.

Aspects of the present disclosure further involve a nontransitory computer readable medium, storing instructions for executing a process, the instructions involving receiving parameters from a plurality of electric vehicles (EVs), a plurality of charging facilities, a power system managing the plurality of charging facilities, and a transportation service system; determining EV dispatch instructions for the plurality of EVs, the instructions directing each of the plurality of EVs to conduct one of providing transportation service, charging at one or more of the plurality of charging facilities, and discharging to the one or more of the plurality of charging facilities, the EV dispatch instructions determined from a plurality of candidate dispatch instructions based on an operation value of the plurality of candidate dispatch instructions calculated from transportation service revenue, operating reserve supply revenue, and revenue consumed from EV travel, as determined from the parameters; and dispatching the EV dispatch instructions to the plurality of EVs.

Aspects of the present disclosure involve a system, which can include means for receiving parameters from a plurality of electric vehicles (EVs), a plurality of charging facilities, a power system managing the plurality of charging facilities, and a transportation service system; means for determining EV dispatch instructions for the plurality of EVs, the instructions directing each of the plurality of EVs to conduct one of providing transportation service, charging at one or more of the plurality of charging facilities, and discharging to the one or more of the plurality of charging facilities, the EV dispatch instructions determined from a plurality of candidate dispatch instructions based on an operation value of the plurality of candidate dispatch instructions calculated from transportation service revenue, operating reserve supply revenue, and revenue consumed from EV travel, as determined from the parameters; and means for dispatching the EV dispatch instructions to the plurality of EVs.

Aspects of the present disclosure involve an apparatus, configured to manage a plurality of electric vehicles (EVs), a plurality of charging facilities, a power system managing the plurality of charging facilities, and a transportation service system, the apparatus involving a memory configured to receive, through a network interface, parameters from the plurality of electric vehicles (EVs), the plurality of charging facilities, the power system managing the plurality of charging facilities, and the transportation service system; and a processor, configured to determine EV dispatch instructions for the plurality of EVs, the instructions directing each of the plurality of EVs to conduct one of providing transportation service, charging at one or more of the plurality of charging facilities, and discharging to the one or more of the plurality of charging facilities, the EV dispatch instructions determined from a plurality of candidate dispatch instructions based on an operation value of the plurality of candidate dispatch instructions calculated from transportation service revenue, operating reserve supply revenue, and revenue consumed from EV travel, as determined from the parameters; and dispatch the EV dispatch instructions to the plurality of EVs.

BRIEF DESCRIPTION OF DRAWINGS

FIG. 2 illustrates an example configuration of the EVs dispatch table, in accordance with an example implementation.

DETAILED DESCRIPTION

Figure 1:
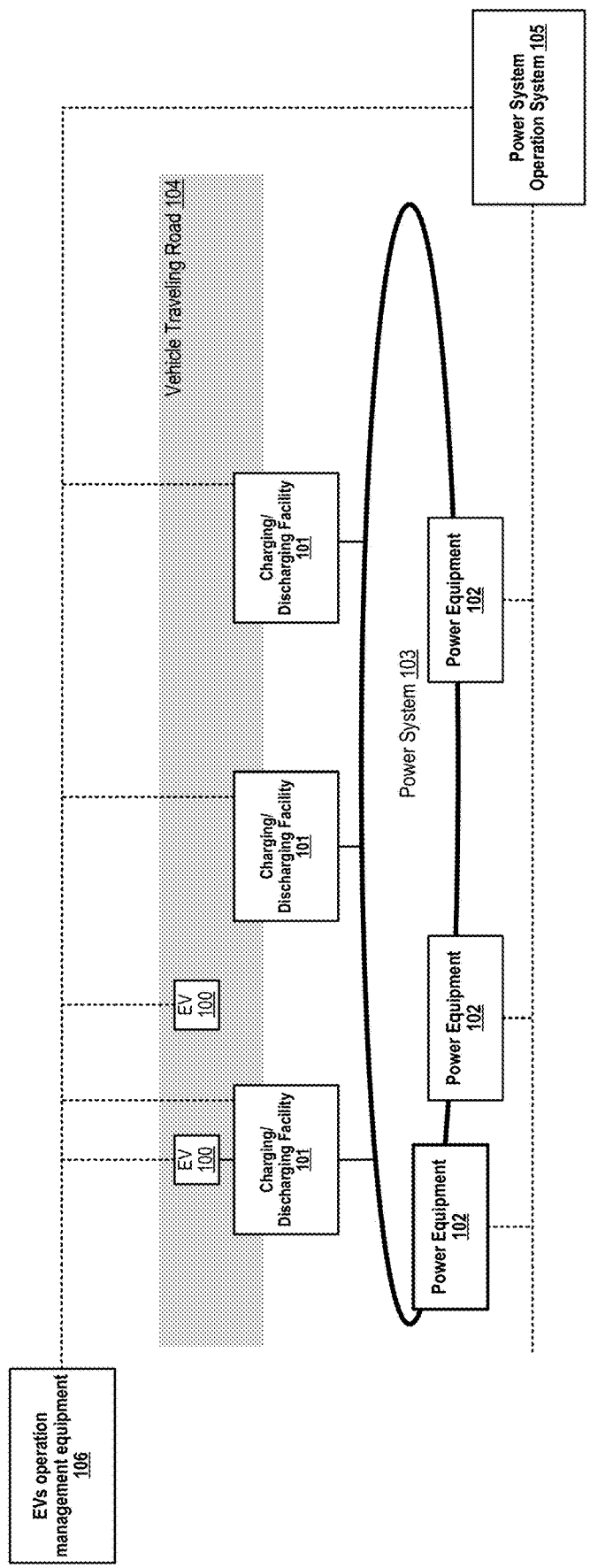
FIG. 1 illustrates an example configuration of equipment and facilities related to the EVs operation management equipment, in accordance with an example implementation.

The following detailed description provides further details of the figures and example implementations of the present application. Reference numerals and descriptions of redundant elements between figures are omitted for clarity.

Terms used throughout the description are provided as examples and are not intended to be limiting. For example, the use of the term "automatic" may involve fully automatic or semi-automatic implementations involving user or administrator control over certain aspects of the implementation, depending on the desired implemen of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an example configuration of equipment and facilities related to the EVs operation management equipment, in accordance with an example implementation. As illustrated in FIG. 1, the overall system can involve EVs 100, charging/discharging facility 101, power equipment 102, power system 103, vehicle traveling road 104, power system operation system 105, and EVs operation management equipment 106.

EVs 100 are electric vehicles that transport people or goods, utilize electric power as the power source and are equipped with batteries inside. Charging/discharging facilities 101 are facilities that connect with power system 103 and EVs 100. Charging/discharging facilities 101 receive electric power from power system 103 to charge the electric power into the batteries of the EVs 100, and also discharge electric power from batteries of EVs to supply the electric power to power system.

Power system 103 is an infrastructure that supplies electric power generated by the power generation facility to equipment 102 that operate using electric power. Power system 103 can involve power equipment 102 such as transmission lines, transformers and switches. Vehicle traveling road 104 is a road infrastructure where EVs 100 can run as a vehicle. EVs 100 travel on the vehicle traveling road 104 to transport people and/or goods from some location to another location.

Power system operation system 105 is a system that controls various power equipment 102 in order to maintain power system stability. In power system operations, it can be necessary to maintain the balance between supply and demand of electric power at all times. However, power consumption amount by end-users and power generation amount by renewable energy fluctuate independently and with uncertainty, and also the gap fluctuates with uncertainty. To operate power system stably, it can be necessary to fill the gap by adjusting the generation amount and the consumption amount at all times. In related art implementations, the power generation amount is adjusted by the controlling thermal power plant, and the demand amount is adjusted by the adjusting electric equipment usage. Such implementations of adjusting supply-demand gap are called "operating reserves". EVs 100 can be utilized as a resource of operating reserve by charging/discharging the batteries.

EVs operation management equipment 106 is an equipment that manages operation of one or more EVs 100 that transport people and/or goods and one or more charging/discharging facilities 101 that the EVs 100 can use, for transportation service and power system operating reserve service utilizing EVs 100 and charging/discharging facilities 101. In particular, it creates operation plan of each EV so that it increases the total operation value by transportation travel and operating reserve supply. The total operation value is the amount obtained by subtracting the value consumed in energy consumption in travel from the total value generated in transportation travel and operating reserve supply. Example implementations described herein are directed to determining whether to use each EV for transportation travel or operating reserve supply, at which time period and what location. Further information utilized by the EVs operation management system 106 is described as follows.

The basic information includes "operation time period segmentation" (hereinafter "OTPS"), "transportation service traveling area" (hereinafter "TSTA"), "transportation service traveling area representative point" (hereinafter "TARP"), "transportation service traveling area representative location" (hereinafter "TARL"), "charging/discharging facility location" (hereinafter "CDFL"), "EV operation status" (hereinafter "EVOS"), "EV location" (hereinafter "EVLO"), "remaining charged amount rate" (hereinafter "SOC"), "EVs dispatch table" (hereinafter "EVDT").

EV operation management equipment 106 divides a day into a plurality of time periods and manages the operations of EVs 100 and charging/discharging facilities 101 for each time period. This definition of time periods is called "operation time period segmentation" (hereinafter "OTPS"). Although the pattern how to divide the time periods can be conducted according to the desired implementation, the examples described herein assume that the 24 hours of the day is divided into 24 time periods by one hour intervals.

EVs operation management equipment 106 manages the area where transportation service is provided, which is divided into a plurality of areas. Each divided area is called the "transportation service traveling area" (hereinafter "TSTA"). Each TSTA is managed and associated with a local point inside the TSTA. The local point is called the "transportation service traveling area representative point" (hereinafter "TARP"), and the location information is called "transportation service traveling area representative location" (hereinafter "TARL").

EVs operation management equipment 106 manages the location information of all charging/discharging facilities 101. The location information is called "charging/discharging facility location" (hereinafter "CDFL").

EVs operation management equipment 106 manages information of the electricity amount consumed by travel between two locations among TARLs and CDFLs. It is a table that associates such electricity amount with the combination of the two locations for all combinations among all TARLs and CDFLs. The table is called "travel electricity consumption table" (it is written as "TECT" hereafter).

EVs operation management equipment 106 manages information of the operation status indicating which each EV is provided for transportation service or power system operating reserve service or electric power charging necessary for travel. The information of operation status is called "EV operation status" (hereinafter "EVOS"). It has a value of either "transportation service (TRS)", "operating reserve service (ORS)", or "electric power charging (EPC)".

EVs operation management equipment manages information indicative of the location of each EV. The location information is called "EV location" (hereinafter "EVLO"). When the EVOS of a EV is TRS, the EVLO of the EV has a TARL value for the TSTA where the EV provides transportation service. When the EVOS is ORS, the EVLO of the EV has a CDFL value for the charging/discharging facility where the EV is connected. When the EVOS is EPC, the EVLO of the EV has a CDFL value for the charging/discharging facility where the EV is connected.

EVs operation management equipment 106 manages remaining charged amount [kWh] and remaining charged amount rate [%] regarding the charged amount status of each EV battery. The remaining charged amount rate is the ratio of the remaining charged electricity amount to the charged amount when the battery is fully charged, referred to as "SOC".

EVs operation management equipment 106 manages the information of the maximum number of EVs that can be charged/discharged at the same time from the charge/discharge facility 101. The information is called "the number of acceptable EVs per charging/discharging facility" (hereinafter "NEVC").

EVs operation management equipment 106 manages the information of operation plan of each EV for the next 24 hours. The information is called "EVs dispatch table" (hereinafter "EVDT").

FIG. 2 illustrates an example configuration of the EVs dispatch table, in accordance with an example implementation. EVs operation management equipment 106 creates EVDT. EVDT is a table that defines the specific operation data for each EV and each time period. The data includes EVOC, EVLO, SOC reference at the end of time period and SOC at the beginning of time period. The data of SOC reference at the end of time period is referred to as "SOCR" hereinafter, and the data of SOC at the beginning of time period is referred to as "SOCB" hereinafter.

Figure 3:
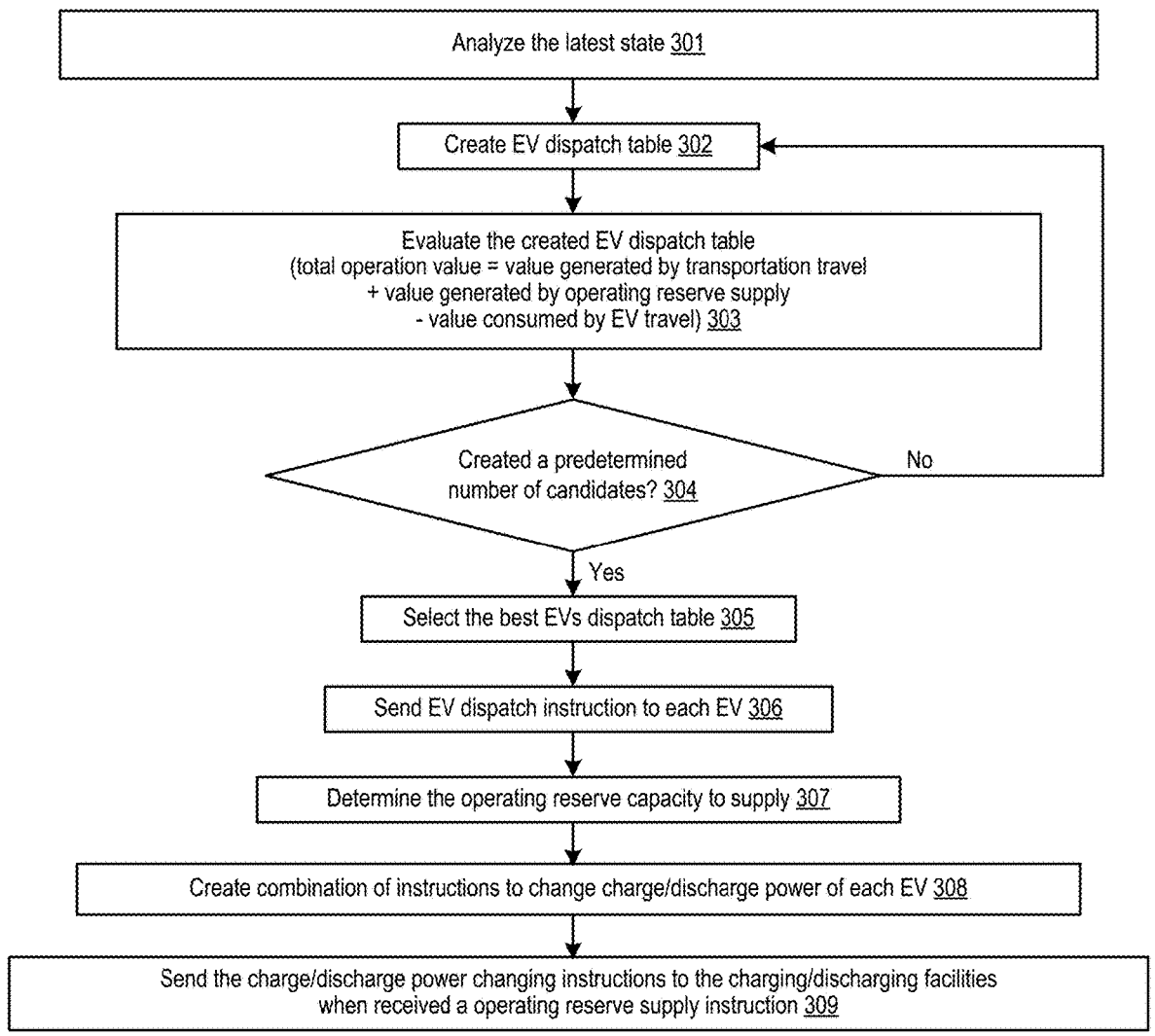
FIG. 3 illustrates an example overall flow for the EVs operation management equipment, in accordance with an example implementation.

FIG. 3 illustrates an example overall flow for the EVs operation management equipment, in accordance with an example implementation. At 301, the EVs operation management equipment analyze the latest state of transportation service, power system operating reserve service, each EV and each charging/discharging facility.

Regarding transportation service, the EVs operation management equipment forecasts transportation service demand and transportation service revenue unit for each TSTA and each time period. The transportation service demand is forecasted as electricity consumption amount [kWh] by EV necessary for performing the service. The transportation service revenue unit is forecasted as service revenue per EV electricity consumption amount unit [$/kWh]. An example for the forecasting method is explained later.

Regarding power system operating reserve service, the EVs operation management equipment forecasts operating reserve service demand and operating reserve service revenue unit for each time period. The operating reserve service demand is forecasted as operating reserve capacity [kW] necessary for the time period. The operating reserve service revenue unit is forecasted as service revenue per operating reserve capacity unit [$/kW]. An example for the forecasting method is explained later.

Regarding EVs, the EVs operation management equipment specifies the latest state of SOC [%] and EVLO of each EV.

Regarding charging/discharging facility, it specifies the latest state of NEVC for each charging/discharging facility.

At 302, the EVs operation management equipment creates a candidate of EVs dispatch table (EVDT) randomly, so that the number of EVs assigned to each charging/discharging facility at the same time is smaller than or equal to the NEVC for the facility. The creation of candidates is explained in further detailed below.

At 303, the EVs operation management equipment evaluates the created EVDT candidate. The evaluated value of the EVDT candidate is the total operation value by transportation travel and power system operating reserve supply. It is the amount obtained by subtracting the value consumed in energy consumption in travel from the sum of the value generated by transportation travel and the value generated by operating reserve supply. For example, the transportation service revenue [$] is used as the value generated by transportation travel, the operating reserve service revenue [$] is used as the value generated by operating reserve supply, consumed energy cost in travel (hereinafter "travel cost") [$] is used as the value consumed in energy consumption in travel, and the total operation value is calculated by subtracting the consumed energy cost from the sum of the transportation service revenue and the operating reserve service revenue. The calculation method is explained in detail below.

The EVs operation management equipment repeats the creation and evaluation of EVDT candidate, until a predetermined number (N_DT) of candidates are created 304. At 305, EVs operation management equipment compares those evaluated values to select the best candidates. The selected candidate is called "best EVs dispatch table" (hereinafter "BEVDT"). EVs operation management equipment sends EV dispatch instructions to each EV according to the selected BEVDT at 306. The EV dispatch instruction is information designating the location at each time period for each EV.

The EVs operation management equipment determines the operating reserve capacity to supply at each time period according to the BEVDT.

When the EVs operation management equipment received a notification of operating reserve supply instruction from power system operation system, the EVs operation management equipment creates a combination of instructions to change charge/discharge power of each EV whose EVOS has "ORS" as the value, so that the total change amount satisfies the instruction from power system operation system at 308. Further, the EVs operation management equipment notifies each change charge/discharge power instruction to the charging/discharging facility that the EV is connected. The creation method is explained in further detail below.

When the EV receives an EV dispatch instruction, the EV moves to the designated location at the designated time period. When the designated location is one of the TARLs, the EV performs transportation service according to request from transportation service customer in the area of the EV. When the designated location is one of the CDFL, the EV connects to the charge/discharge facility and receives charge/discharge control of the facility at the CDFL of the EV.

When charge/discharge facility receives a charge/discharge power changing instruction, the charge/discharge facility changes the charging/discharging state of the designated EV into the designated state.

Figure 4:
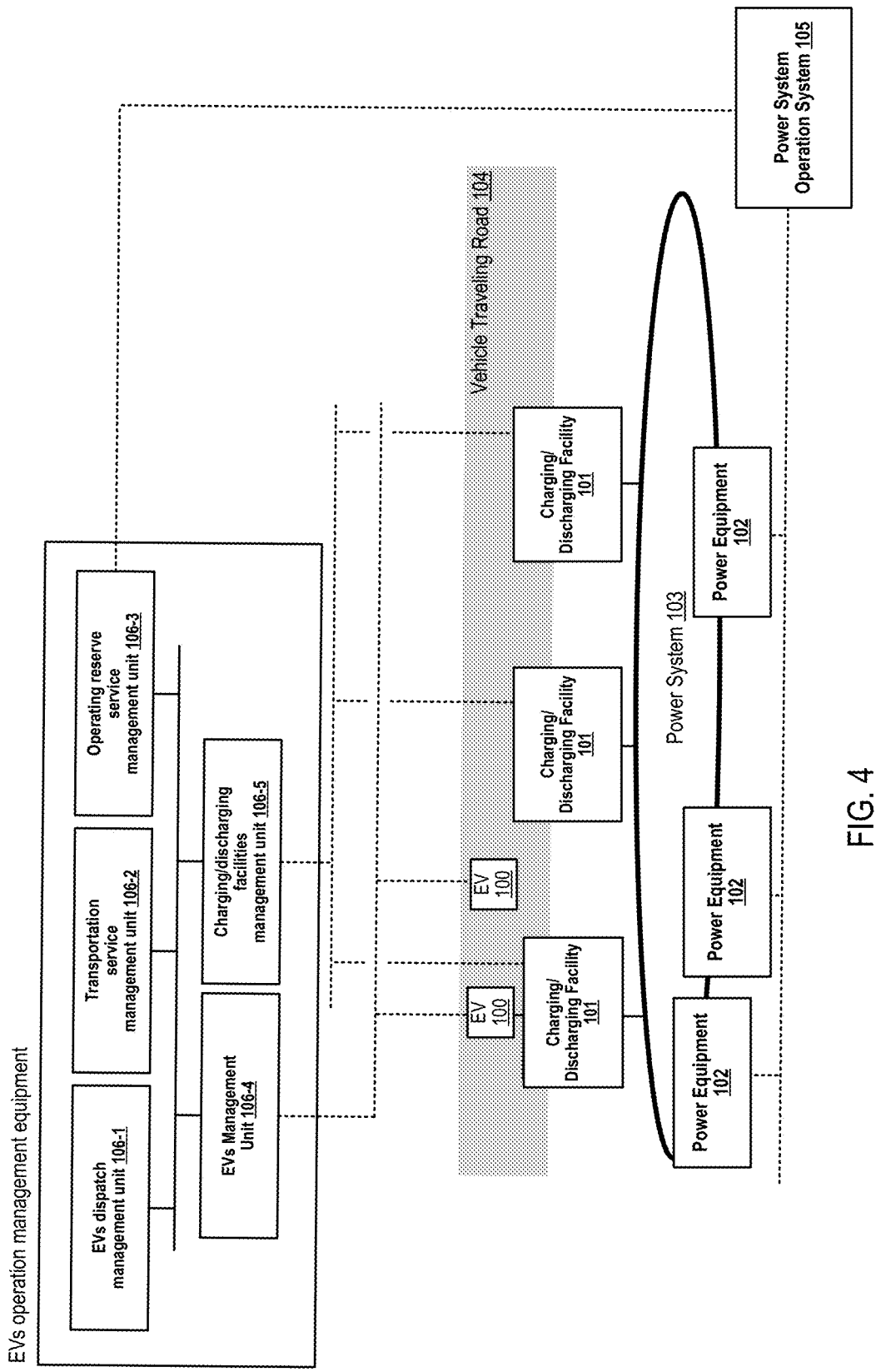
FIG. 4 illustrates an example of a functional block configuration facilitating the EVs operation management equipment, in accordance with an example implementation.

FIG. 4 illustrates an example of functional blocks configuration which facilitates the EVs operation management equipment 106, in accordance with an example implementation. EVs operation management equipment 106 can involve functional blocks that are represented as software program module respectively. The functional blocks include the EVs dispatch management unit 106-1, the transportation service management unit 106-2, the operating reserve service management unit 106-3, the EVs management unit 106-4 and the charging/discharging facilities management unit 106-5. The process of each functional block is explained in more detail for FIG. 5 to FIG. 9.

Figure 5:
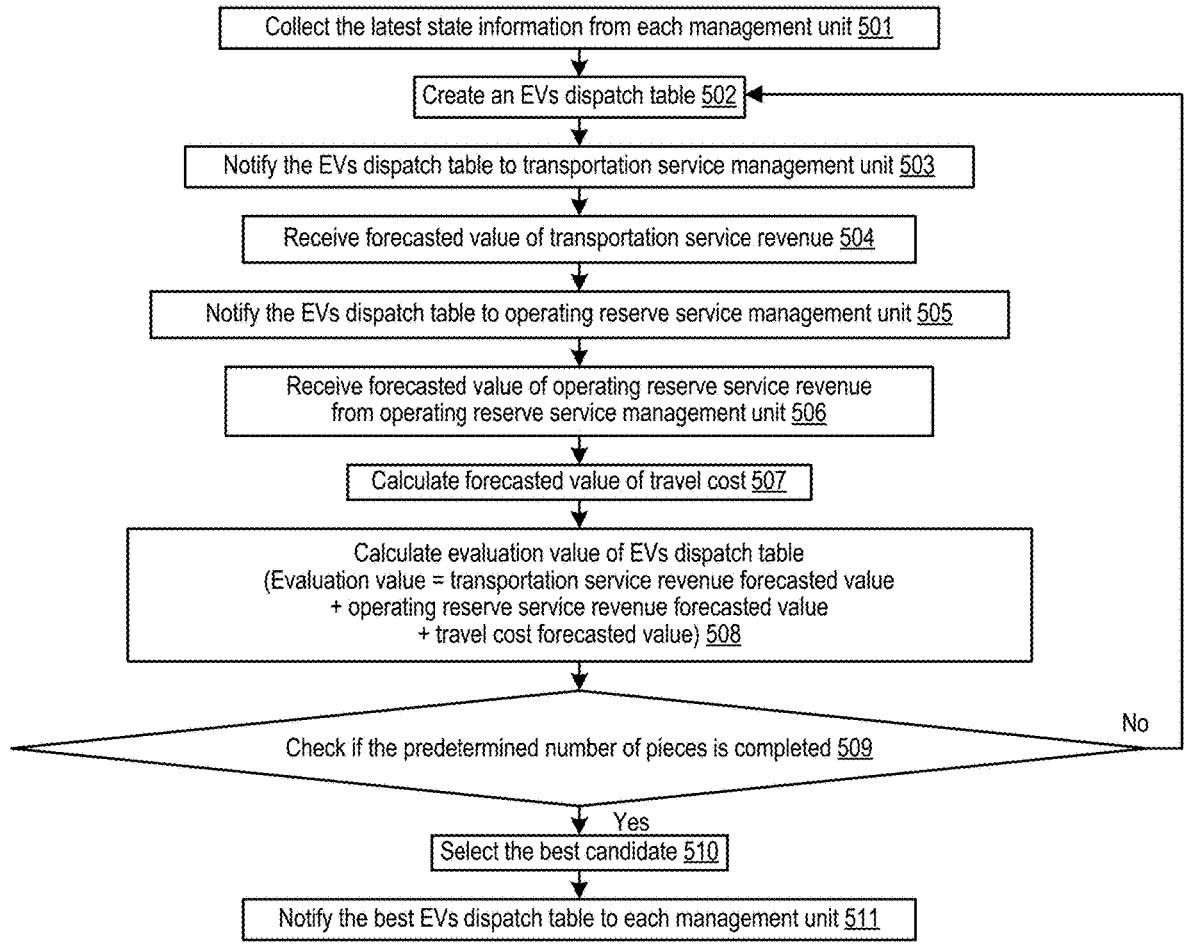
FIG. 5 illustrates an example process flow of the EVs dispatch management unit, in accordance with an example implementation.

FIG. 5 illustrates an example process flow of the EVs dispatch management unit 106-1, in accordance with an example implementation. At 501, the EVs dispatch management unit 106-1 distributes notifications to inquire the latest status from the other functional blocks of the EVs operation management equipment 106, and receives the results. The EVs dispatch management unit 106-1 receives the forecasted data of transportation service demand [kWh] and transportation service revenue unit [$/kWh] regarding the transportation service status from the transportation service management unit 106-2.

The EVs dispatch management unit 106-1 receives the forecasted data of operating reserve service demand [kW] and operating reserve service revenue unit [$/kW] regarding the operating reserve service status from the operating reserve service management unit 106-3.

The EVs dispatch management unit 106-1 receives the latest state data of SOC [%] and EVLO of each EV regarding EV status from the EVs management unit 106-4.

The EVs dispatch management unit 106-1 receives the latest state data of NEVC of each charge/discharging facility regarding charging/discharging facility status from the charging/discharging facilities management unit 106-5.

At 502, the EVs dispatch management unit 106-1 creates a EVs dispatch table (EVDT). It is created by the following procedure.

(1) Select an EV from EVs 100 managed by the EVs operation management equipment 106.

(2) For the selected EV, set the values for EVOS, EVLO, SOCR for each time period and the value of SOCB for the first time period according to steps (2-1)-(2-5), and go to step (3).

(2-1) Create an EVLO candidates list which shows EVLO candidates for each time period for the EV. The EVLO candidates are all TARLs and all CDFLs where the NEVC for the time period is greater than or equal to 1.

(2-2) Set the value of EVLO for each time period for the EV. The value is selected randomly from the candidates for the time period which are shown in the EVLO candidates list.

(2-3) Set the value of EVOS for each time period for the EV. The value is set to "transportation service (TRS)" when the EVLO for the time period is assigned of a TARL. The value is set to "operating reserve service (ORS)" or "electric power charging for travel (EPC)" randomly when the EVLO for the time period is assigned of a CDFL.

(2-4) Set value of SOCR [%] for each time period for the EV. The value is set to "SOCR at transportation service" or "SOCR at operating reserve service" or "SOCR at electric power charging for travel" depending on whether EVOS is TRS or ORS or EPC respectively. The "SOCR at transportation service", "SOCR at operating reserve service" and "SOCR at electric power charging for travel" are arbitrarily determined in advance, but here for example, they are assumed that 10 [%], 10[%] and 90[%], respectively.

(2-5) Set value of SOCB [%] for the first time period for the EV. The value is set to the current value of SOC of the EV.

(3) Select another EV from EVs managed by the EVs operation management equipment.

(4) Set values of EVOS, EVLO, SOCR for each time period and SOCB for the first time period for the selected EV through the steps outlined in (4-1)-(4-5), and go to step (5) afterwards.

(4-1) Create a EVLO candidates list which shows EVLO candidates for each time period for the EV. The EVLO candidates are all TARLs and all CDFLs where the value obtained by subtracting the number of EVs already assigned of the CDFL from the NEVC for the time period is greater than or equal to 1.

(4-2) Set value of EVLO for each time period for the EV. The value is selected randomly from the candidates for the time period which are shown in the EVLO candidates list.

(4-3) Set value of EVOS for each time period for the EV. The value is set to TRS when the EVLO for the time period was assigned of a TARL. The value is set to ORS or EPC randomly when the EVLO for the time period was assigned of a CDFL.

(4-4) Set value of SOCR [%] for each time period for the EV. The value is set to "SOCR at transportation service" or "SOCR at operating reserve service" or "SOCR at electric power charging for travel" depending on whether EVOS is TRS or ORS or EPC. The "SOCR at transportation service", "SOCR at operating reserve service" and "SOCR at electric power charging for travel" are arbitrarily determined in advance, but here for example, they are assumed that 10 [%], 10[%] and 90[%], respectively.

(4-5) Set value of SOCB [%] for the first time period for the EV. The value is set to the current value of SOC of the EV.

(5) Repeat steps (3) and (4) for all other EVs managed by the EVs operation management equipment.

(6) Thus, one EVs dispatch table is created.

In the next part, the EVs dispatch management unit 106-1 evaluates the created EVDT candidate through the following process:

(1) Calculate the forecasted data of transportation service revenue, operating reserve service revenue and travel cost by steps (1-1)-(1-3), and go to the step (2).

(1-1) Notify the EVDT to the transportation service management unit 106-2 as shown at 503, and receive the forecasted value of the transportation service revenue [$] calculated by the Transportation service management unit 106-2 based on the EVDT as shown at 504. The calculation method of forecasting of transportation service revenue is explained in more detail below.

(1-2) Notify the EVDT to the operating reserve service management unit 106-3 as shown at 505, and receive the forecasted value of the operating reserve service revenue [$] calculated by the operating reserve service management unit 106-3 based on the EVDT as shown at 506. The calculation method of the forecasting is explained in more detail below.

(1-3) For all EVs, the EVs dispatch management unit 106-1 obtains the TECT and gets the value of the consumed energy amount [kWh] by travel between two locations specified in adjacent time periods. The EVs dispatch management unit 106-1 aggregates them for all time periods and for all EVs. The EVs dispatch management unit 106-1 multiplies the aggregated value [kWh] by the predetermined value of the travel cost unit per consumed energy amount unit [$/kWh] and determines the result as the forecasted value of the travel cost [$] at 507.

(2) The EVs dispatch management unit 106-1 calculates the evaluation value of the EVDT by calculation formula of "the evaluation value=the transportation service revenue forecasted value+the operating reserve service revenue forecasted value+the travel cost" as shown at 508.

At 509, the EVs dispatch management unit 106-1 checks if N_DT pieces of EVDTs were created and evaluated. If it is insufficient (No), the EVs dispatch management unit 106-1 repeats the creation and evaluation process by proceeding back to 502, otherwise the flow proceeds to 510.

At 510, the EVs dispatch management unit 106-1 selects one EVDT of the largest evaluation value as the best EVs dispatch table (BEVDT).

At 511, the EVs dispatch management unit 106-1 notifies the BEVDT to the EVs management unit 106-4 and the operating reserve service management unit 106-3.

Figure 6:
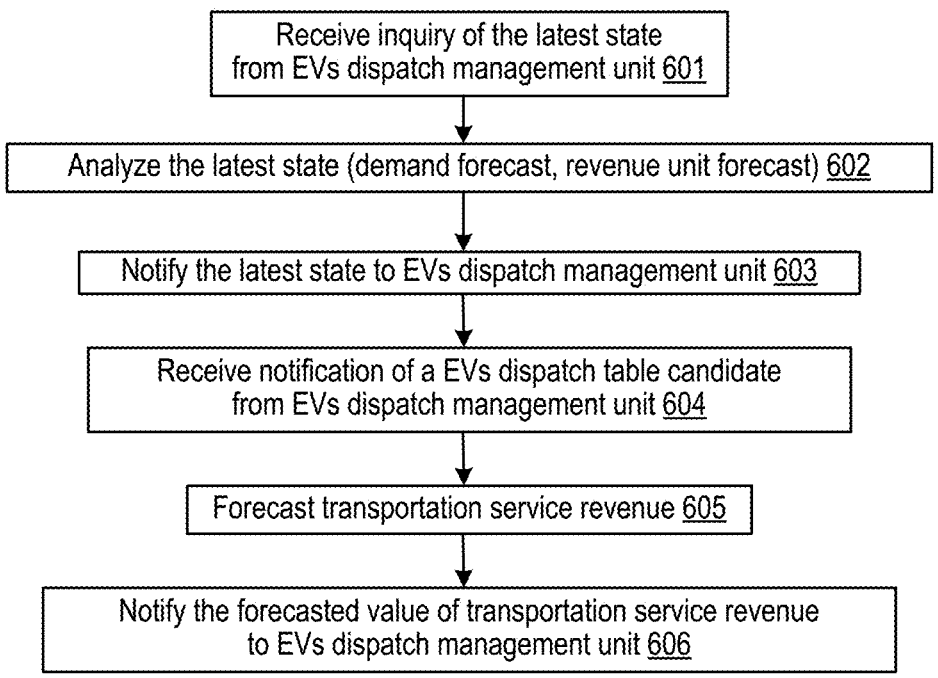
FIG. 6 illustrates an example flow for the transportation service management unit, in accordance with an example implementation.

FIG. 6 illustrates an example flow for the transportation service management unit 106-2, in accordance with an example implementation.

At 601, the transportation service management unit 106-2 receives an inquiry of the latest state of transportation service, and conducts analysis on the latest state at 602. At 603, the latest state is sent as a notification to EV dispatch management unit. At 604, the transportation service management unit 106-2 receives a notification of an EVs dispatch table (EVDT) candidate, and calculates the forecasted value of transportation service revenue expected for the candidate at 605.

When the transportation service management unit 106-2 received an inquiry of the latest state, it forecasts the transportation service demand and the transportation service revenue unit for each TSTA and each time period. For the transportation service demand, the transportation service management unit 106-2 calculates the average value of electricity consumption amount [kWh] by EVs necessary for performing the service in the same TSTA on the same day at the same time period in the past, and divides the average value by pre-determines parameter "transportation service share rate [%]". The resulting value is used as the forecasted value of the transportation service demand [kWh]. For the transportation service revenue unit, the Transportation service management unit 106-2 calculates the average value of unit amount [$/kWh] of transportation service revenue [$] per EVs energy consumption amount [kWh] in past for the same TSTA, the same day and the same time period, and determines it as the forecasted value of the transportation service revenue unit [$/kWh]

When the transportation service management unit 106-2 received a notification of an EVDT candidate, it calculates the forecast value of transportation service revenue expected for the candidate, and notifies the calculated value to the EVs dispatch management unit 106-1 at 606. The forecasted value is calculated as follows.

(1) Set values of remaining charged amount [kWh] for each time period for each EV managed by the EVs operation management equipment through steps (1-1)-(1-8), and proceed to the step (2).

(1-1) Select an EV managed by EVs operation management equipment.

(1-2) Process for the first time period.

(1-3) The transportation service management unit 106-2 calculates the remaining charged amount [kWh] for the first time period by multiplying the charged amount capacity [kWh] by the SOCB [%] for the first time period given in the EVDT candidate.

(1-4) When the EVOS is TRS, the transportation service management unit 106-2 calculates the remaining charged amount [kWh] at the end of the first time period by the calculation formula "SOCB of the EV [kWh]×(1−Min {transportation service demand forecast value [kWh]×transportation service share rate [%], total remaining charged amount of transportation traveling EVs [kWh]}/(total remaining charged amount of transportation traveling EVs [kWh]))". When the EVOS is ORS, the transportation service management unit 106-2 calculates the remaining charged amount [kWh] at the end of the first time period by calculation formula "the charged amount capacity of the EV [kWh]×SOCR at operating reserve service [%]". When the EVOS is EPC, the transportation service management unit 106-2 calculates the remaining charged amount [kWh] at the end of the first time period by calculation formula "the charged amount capacity of the EV [kWh]×SOCR at electric power charging for travel [%]".

(1-5) Proceed to the next time period.

(1-6) The transportation service management unit 106-2 sets the remaining charged amount for the time period [kWh] as the remaining charged amount at the end of the previous time period [kWh].

(1-7) When the EVOS is TRS, the Transportation service management unit 106-2 calculates the remaining charged amount [kWh] at the end of the time period by the calculation formula "SOCB of the EV [kWh]×(1−Min {transportation service demand forecast value [kWh]×transportation service share rate [%], total remaining charged amount of transportation traveling EVs [kWh]}/(total remaining charged amount of transportation traveling EVs [kWh]))". When the EVOS is ORS, the Transportation service management unit 106-2 calculates the remaining charged amount [kWh] at the end of first time period by calculation formula "the charged amount capacity of the EV [kWh]× SOCR at operating reserve service [%]". When the EVOS is EPC, the transportation service management unit 106-2 calculates the remaining charged amount [kWh] at the end of the time period by calculation formula "the charged amount capacity of the EV [kWh]×SOCR at electric power charging for travel [%]".

(1-8) Repeat steps (1-2)-(1-7) for all other EVs managed by the EVs operation management equipment.

(2) The transportation service management unit 106-2 calculates the forecasted value of transportation service revenue by the calculation formula "(the total amount of the remaining charged amount at the end of the time period of all EVs assigned the TSTA [kWh]−the total amount of the remaining charged amount at the beginning of the time period of all EVs assigned the TSTA [kWh])*the forecasted value of transportation service revenue unit for the time period for the TSTA [$/kWh]".

(3) The Transportation service management unit 106-2 aggregates the forecasted values of transportation service revenue for all TSTA for all time period calculated in step (2). The aggregated value is the forecasted value of transportation service revenue [$].

Figure 7:
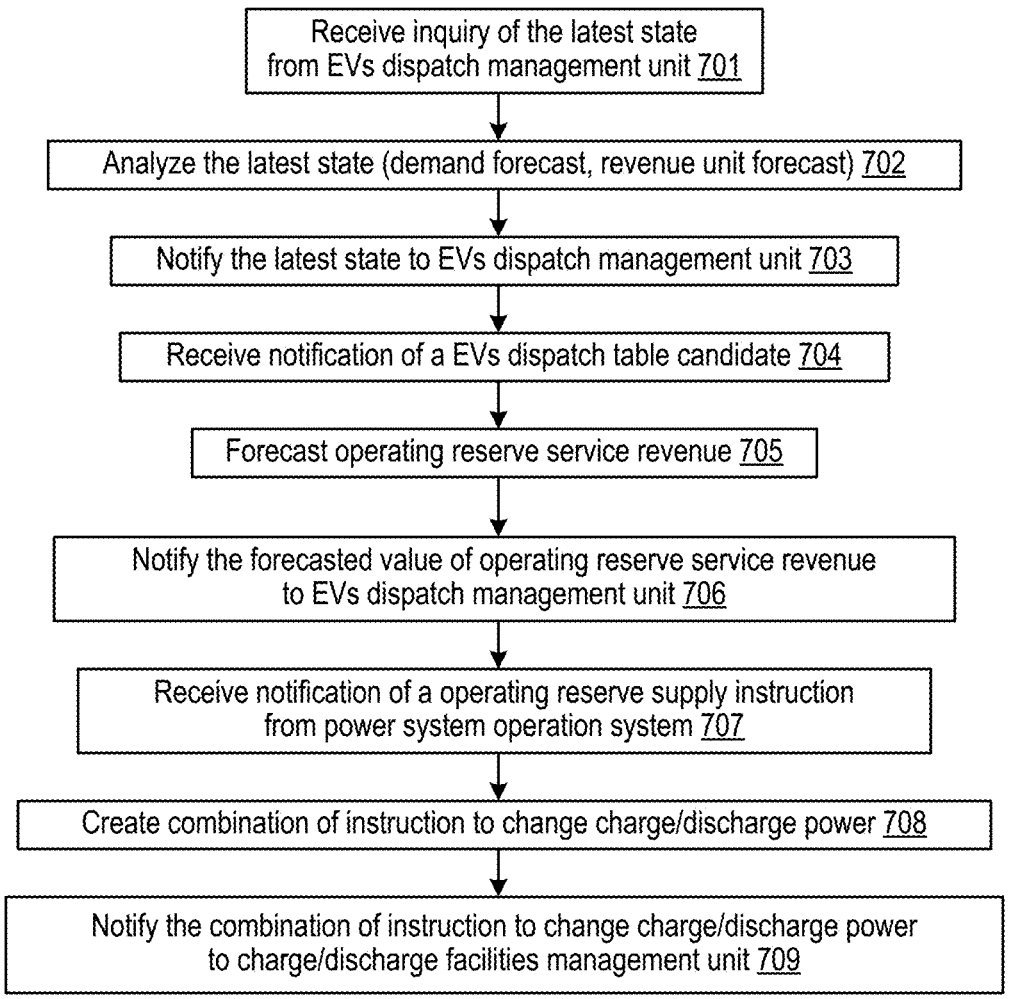
FIG. 7 illustrates an example flow for the operating reserve service management unit, in accordance with an example implementation.

FIG. 7 illustrates an example flow for the operating reserve service management unit 106-3, in accordance with an example implementation. At 701, the operating reserve service management unit 106-3 receives an inquiry of the latest state of operating reserve service, and analyzes the inquiry at 702. At 703, the operating reserve service management unit 106-3 provides the latest state to the EVs dispatch management unit 106-1. Further, the transportation service management unit 106-2 receives a notification of an EVDT candidate, and calculates the forecasted valued of operating reserve service revenue expected for the candidate. The transportation service management unit 106-2 also receives a notification of operating reserve supply instruction from power system operation system 105, and a creates combination of instructions to change charge/discharge power for each EV whose EVOS has ORS as the value.

When the operating reserve service management unit 106-3 receives an inquiry of the latest state, it forecasts the operating reserve service demand and the operating reserve service revenue unit for each time period. For the operating reserve service demand, the operating reserve service management unit 106-3 calculates the average value of provided operating reserve service capacity [kW] in the past for the same day and the same time period, and divides the average value by pre-determined parameter "operating reserve service share rate [%]", and determines it as the forecasted value of the operating reserve service demand[kW]. For the operating reserve service revenue unit, the operating reserve service management unit 106-3 calculates the average value of unit amount [$/kW] of operating reserve service revenue [$] per the operating reserve service capacity [kW] in the past for the same day and the same time period, and determines it as the forecasted value of the operating reserve service revenue unit [$/kW].

When the operating reserve service management unit 106-3 receives a notification of an EVDT candidate at 704, the operating reserve service management unit 106-3 calculates the forecast value of operating reserve service revenue expected for the candidate, at 705 and notifies the calculated value to the EVs dispatch management unit 106-1 at 706. The forecasted value is calculated as follows:

(1) Set values of operating reserve service capacity [kW] for each time period by using steps (1-1)-(1-5), and proceed to step (2)

(1-1) Select a charging/discharging facility managed by EVs operation management equipment.

(1-2) The operating service management unit 106-3 calculates the number of EVs whose EVLO is assigned the CDFL and the EVOS is assigned ORS, according to the EVDT candidate.

(1-3) The operating service management unit 106-3 calculates the operating reserve service capacity of the charging/discharging facility for the time period [kW] by multiplying the number of EVs by the pre-determined operating reserve service capacity per one EV.

(1-4) Repeat steps (1-1)-(1-3) for all other charging/discharging facilities managed by the EVs operation management equipment.

(1-5) The operating reserve service management unit 106-3 aggregates the calculated values of operating reserve service capacity [kW] for all charging/discharging facilities. The aggregated value is the operating reserve service capacity [kW] for the time period.

(2) The operating reserve service management unit 106-3 calculates the forecasted value of operating reserve service revenue for each time period by the calculation formula "the operating reserve service capacity for the time period [kW]× the forecasted value of operating reserve service revenue unit for the time period [$/kW]".

(3) The operating reserve service management unit 106-3 aggregates the forecasted values of operating reserve service revenue for all time periods, and determines it as the forecasted value of operating reserve service revenue.

The operating reserve service management unit 106-3 receives a notification of operating reserve supply instruction from power system operation system at 707, and creates a combination of instructions to change the charge/discharge power of each charging/discharging facility at 708. The targeted EVs for changing the charge/discharge power are only EVs whose EVOS is ORS. The operating reserve service management unit 106-3 selects one EV randomly from the targeted EVs one by one, and determines the instruction to change the charge/discharge power to be maximum, and selects additional EV to satisfy the charge/discharge amount instructed in the operating reserve supply instruction. The operating reserve service management unit 106-3 notifies the created combination of instructions to the charge/discharge facilities management unit at 709.

Figure 8:
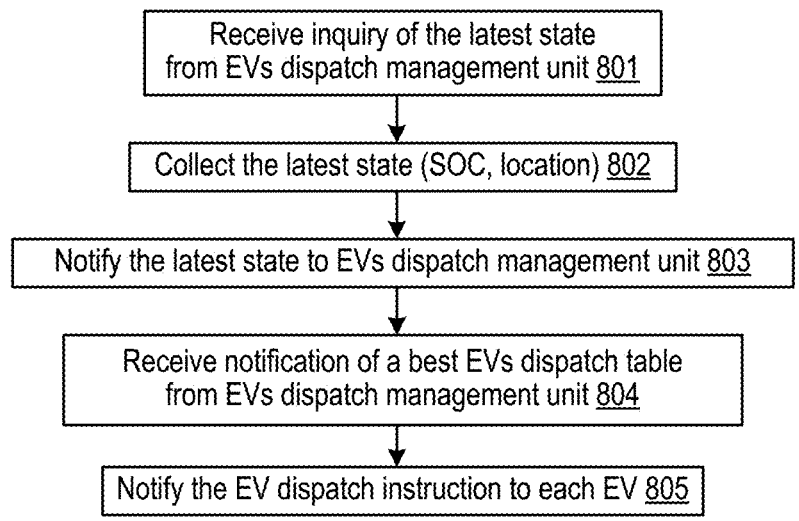
FIG. 8 illustrates an example process flow for EVs management unit, in accordance with an example implementation.

FIG. 8 illustrates an example process flow for EVs management unit 106-4, in accordance with an example implementation. At 801, the EVs management unit 106-4 receives an inquiry of the latest state of EVs, and collects the information from each EV at 802. At 803, the EVs management unit 106-4 notifies the latest state to EVs dispatch management unit 106-1. Further, the EVs management unit 106-4 receives a notification of a best EVs dispatch table (BEVDT) at 804, and notifies EV dispatch instruction to each EV according to the BEVDT at 805.

When the EVs management unit 106-4 receives an inquiry regarding the latest state, the EVs management unit 106-4 collects the latest state information from each EV's controller. The information to be collected includes SOC [%] and EVLO for the period of time. Further, the EVs management unit 106-4 notifies the data to the EVs dispatch management unit 106-1 as shown at 803.

When the EVs management unit 106-4 receives a notification of a BEVDT, the EVs management unit 106-4 notifies each EV's controller of the EVLO which is designated for the first time period of the BEVDT. The controller of each EV notifies the driver of the EVLO by screen display or audio output. For EVs equipped with autonomous driving functionality, the functionality can be realized to drive to the EVLO autonomously by the controller.

Figure 9:
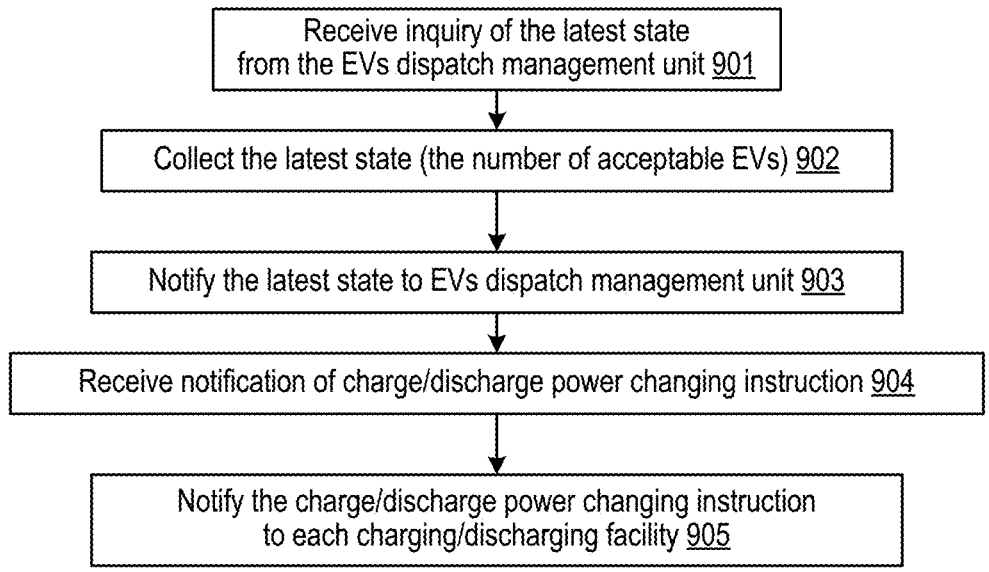
FIG. 9 illustrates an example process flow of the charging/discharging facilities management unit, in accordance with an example implementation.

FIG. 9 illustrates an example process flow of the charging/discharging facilities management unit 106-5, in accordance with an example implementation. At 901, the charging/discharging facilities management unit 106-5 receives an inquiry of the latest state, and collects the information from each charging/discharging facility at 902. At 903, the charging/discharging facilities management unit 106-5 notifies the latest state to the EVs dispatch management unit 106-1. At 904, the charging/discharging facilities management unit 106-5 receives a notification of a charge/discharge power changing instruction, and notifies each charging/discharging facility 101 of charge/discharge power changing instruction at 905.

When the charging/discharging facilities management unit 106-5 receives an inquiry of the latest state, the charging/discharging facilities management unit 106-5 collects the latest state information from each charging/discharging facility's controller. The information to be collected includes NEVC for the period of time. Further, the charging/discharging facilities management unit 106-5 notifies the data to the EVs dispatch management unit 106-1.

When the charging/discharging facilities management unit 106-5 receives a notification of a charge/discharge power changing instruction, the charging/discharging facilities management unit 106-5 notifies the designated charging/discharging facility 101 of the instruction that changes the charge/discharge power amount for the designated EVs by the designated changing amount.

As described herein, example implementations can be implemented within the planning system configured to manage EV operations, in the EVs charging/discharging facilities network operation planning system, and/or the power system operating reserve aggregation system in accordance with the desired implementation.

Figure 10:
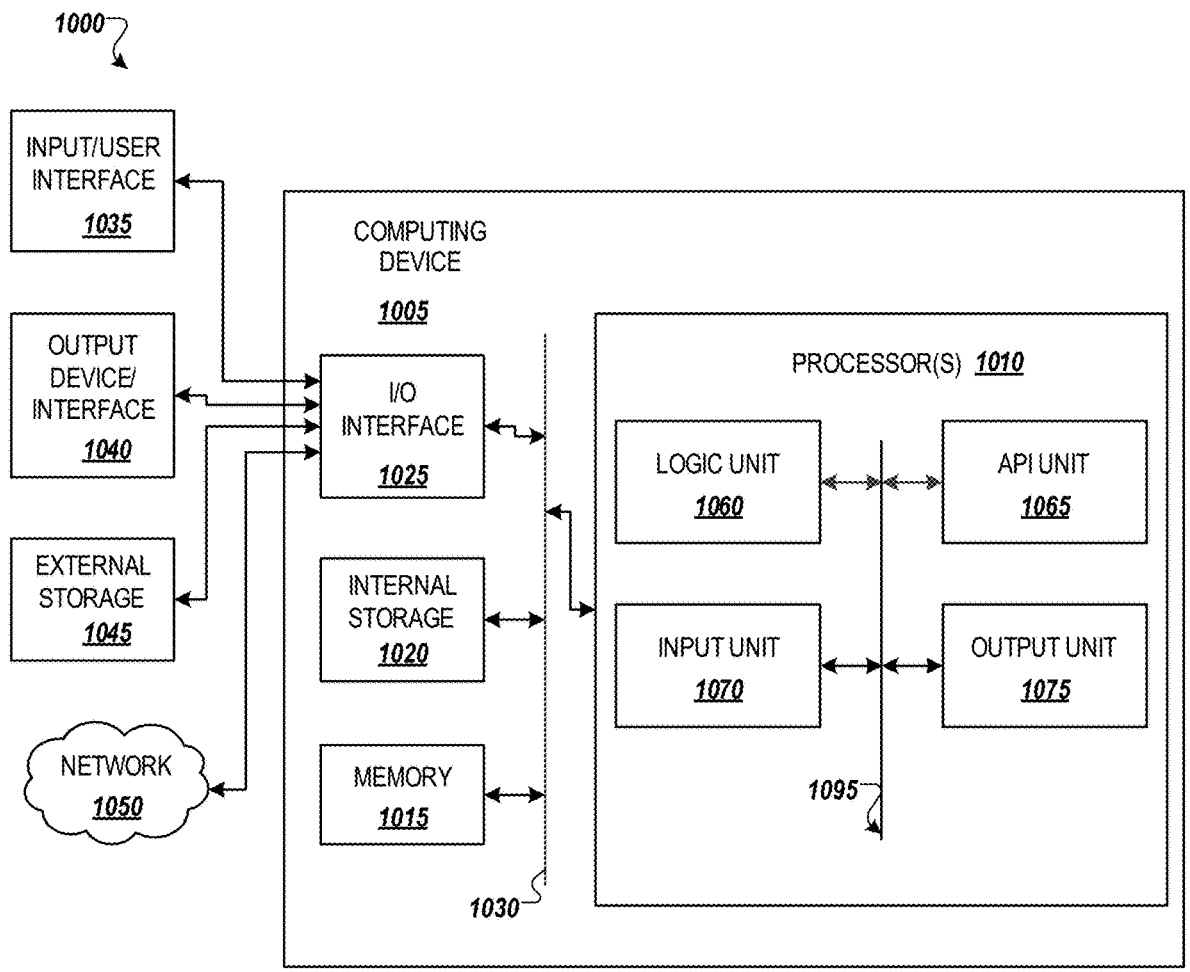
FIG. 10 illustrates an example computing environment with an example computer device suitable for use in example implementations.

FIG. 10 illustrates an example computing environment with an example computer device suitable for use in example implementations, such as for an apparatus configured to manage a plurality of electric vehicles (EVs), a plurality of charging facilities, a power system managing the plurality of charging facilities, and a transportation service system as illustrated in the EVs operation management equipment of FIG. 4. Computer device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computer device 1005.

Computer device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005. In example implementations involving a touch screen display, a television display, or any other form of display, the display is configured to provide a user interface.

Examples of computer device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via I/O interface 1025) to external storage 1045 and network 1050 for communicating with any number of networked components, devices, and systems, including one or more computer devices of the same or different configuration. Computer device 1005 or any connected computer device can be functioning as, providing services of, or referred to as a server, client, thin server, general machine, special-purpose machine, or another label.

I/O interface 1025 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computer device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Memory 1015 may be configured to store or manage algorithms to be executed by processor(s) 1010 as described in the flow, for example, of FIGS. 5-9. The example implementations as described herein may be conducted singularly, or in any combination of each other according to the desired implementation and are not limited to a particular example implementation.

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided. Processor(s) 1010 can be in the form of physical processors or central processing units (CPU) that is configured to execute instructions loaded from Memory 1015.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, input unit 1070, output unit 1075, in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide output based on the calculations described in example implementations.

Memory 1015 can be configured to receive, through a network interface, parameters from the plurality of electric vehicles (EVs), the plurality of charging facilities, the power system operation system managing the plurality of charging facilities, and the transportation service system, which can be utilized to generate EV dispatch instructions as illustrated in FIG. 2.

Processor(s) 1010 can be configured to determine EV dispatch instructions for the plurality of EVs, the instructions directing each of the plurality of EVs to conduct one of providing transportation service, charging at one or more of the plurality of charging facilities, and discharging to the one or more of the plurality of charging facilities, the EV dispatch instructions determined from a plurality of candidate dispatch instructions based on an operation value of the plurality of candidate dispatch instructions calculated from transportation service revenue, operating reserve supply revenue, and revenue consumed from EV travel, as determined from the parameters; and dispatch the EV dispatch instructions to the plurality of EVs as illustrated in FIGS. 4-9.

Depending on the desired implementation, the EV dispatch instructions can be further based on a constraint regarding a maximum number of EVs that can be connected to each of the plurality of facilities, wherein ones of the plurality of EVs assigned to charge or discharge at the one or more the plurality of charging facilities are assigned based on the constraint as illustrated in FIGS. 1 and 7.

Processor(s) 1010 are further configured to, for the EV dispatch instructions being one of the charging at the one or more of the plurality of charging facilities or the discharging to the one or more of the plurality of charging facilities, dispatch the EV dispatch instructions to the one or more of the plurality of charging facilities to initiate one of charging and discharging of the ones of the plurality of EVs instructed to conduct one of charging and discharging as illustrated in FIGS. 5 and 9.

Processor(s) 1010 are further configured to generate the plurality of candidate dispatch instructions; and associate each of the plurality of candidate dispatch instructions with the operation value; wherein the parameters can involve forecasted transportation service revenue, forecasted operating reserve supply revenue; wherein the revenue consumed from EV travel is calculated based on distance to be travelled by an EV instructed to provide transportation service, as illustrated in FIGS. 5-8.

Depending on the desired implementation, the forecasted transportation service revenue can be derived based on a difference between a remaining charge amount for ones of the plurality of EVs assigned to provide transportation service before the transportation service and after the transportation service as illustrated in FIG. 6.

Processor(s) 1010 are further configured to, for receipt of an update of the parameters, adjust the operation value based on the updated parameters, and update the selection of the EV dispatch instructions based on the updated operation value as illustrated in FIG. 5.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:

receiving parameters from a plurality of autonomous electric vehicles (EVs), a plurality of charging facilities, a power system operation system managing the power system connected to the plurality of charging facilities, and a transportation service system, wherein the parameters comprise forecasted transportation service revenue and forecasted operating reserve supply revenue, the forecasted transportation service revenue is calculated based on service revenue per EV electricity consumption and the forecasted operating reserve supply revenue is calculated based on service revenue per operating reserve capacity;

determining EV dispatch instructions for the plurality of EVs, the instructions directing each of the plurality of EVs to conduct one of providing transportation service, charging at one or more of the plurality of charging facilities, and discharging to the one or more of the plurality of charging facilities, the EV dispatch instructions determined from a plurality of candidate dispatch instructions based on an operation value of the plurality of candidate dispatch instructions calculated from transportation service revenue, operating reserve supply revenue, and revenue consumed from EV travel, as determined from the parameters, wherein the revenue consumed from EV travel is calculated based on distance to be travelled by an EV instructed to provide transportation service;

dispatching the EV dispatch instructions to the plurality of EVs;

for receipt of an update of the parameters, adjusting the operation value based on the updated parameters, and updating the selection of the EV dispatch instructions based on the updated operation value; and controlling autonomously, based on the determined EV dispatch instructions, the plurality of EVs to perform one of providing transportation service, charging at the one or more of the plurality or charging facilities, and discharging to the one or more of the plurality of charging facilities.

2. The method of claim 1, wherein the EV dispatch instructions are further based on a constraint regarding a maximum number of EVs that can be connected to each of the plurality of facilities, wherein ones of the plurality of EVs assigned to charge or discharge at the one or more the plurality of charging facilities are assigned based on the constraint.

3. The method of claim 1, further comprising, for the EV dispatch instructions being one of the charging at the one or more of the plurality of charging facilities or the discharging to the one or more of the plurality of charging facilities, dispatching the EV dispatch instructions to the one or more of the plurality of charging facilities to initiate one of charging and discharging of the ones of the plurality of EVs instructed to conduct one of charging and discharging.

4. The method of claim 1, further comprising:
generating the plurality of candidate dispatch instructions; and
associating each of the plurality of candidate dispatch instructions with the operation value.

5. The method of claim 4, wherein the forecasted transportation service revenue is derived based on a difference between a remaining charge amount for ones of the plurality of EVs assigned to provide transportation service before the transportation service and after the transportation service.

6. A non-transitory computer readable medium, storing instructions for executing a process, the instructions comprising:

receiving parameters from a plurality of autonomous electric vehicles (EVs), a plurality of charging facilities, a power system operation system managing the power system connected to the plurality of charging facilities, and a transportation service system, wherein the parameters comprise forecasted transportation service revenue and forecasted operating reserve supply revenue, the forecasted transportation service revenue is calculated based on service revenue per EV electricity consumption and the forecasted operating reserve supply revenue is calculated based on service revenue per operating reserve capacity;

determining EV dispatch instructions for the plurality of EVs, the instructions directing each of the plurality of EVs to conduct one of providing transportation service, charging at one or more of the plurality of charging facilities, and discharging to the one or more of the plurality of charging facilities, the EV dispatch instructions determined from a plurality of candidate dispatch instructions based on an operation value of the plurality of candidate dispatch instructions calculated from transportation service revenue, operating reserve supply revenue, and revenue consumed from EV travel, as determined from the parameters, wherein the revenue consumed from EV travel is calculated based on distance to be travelled by an EV instructed to provide transportation service;

dispatching the EV dispatch instructions to the plurality of EVs;

for receipt of an update of the parameters, adjusting the operation value based on the updated parameters, and updating the selection of the EV dispatch instructions based on the updated operation value; and controlling autonomously, based on the determined EV dispatch instructions, the plurality of EVs to perform one of providing transportation service, charging at the one or more of the plurality of charging facilities, and discharging to the one or more of the plurality of charging facilities.

7. The non-transitory computer readable medium of claim 6, wherein the EV dispatch instructions are further based on a constraint regarding a maximum number of EVs that can be connected to each of the plurality of facilities, wherein ones of the plurality of EVs assigned to charge or discharge at the one or more the plurality of charging facilities are assigned based on the constraint.

8. The non-transitory computer readable medium of claim 6, the instructions further comprising, for the EV dispatch instructions being one of the charging at the one or more of the plurality of charging facilities or the discharging to the one or more of the plurality of charging facilities, dispatching the EV dispatch instructions to the one or more of the plurality of charging facilities to initiate one of charging and discharging of the ones of the plurality of EVs instructed to conduct one of charging and discharging.

9. The non-transitory computer readable medium of claim 6, the instructions further comprising:
generating the plurality of candidate dispatch instructions; and
associating each of the plurality of candidate dispatch instructions with the operation value.

10. The non-transitory computer readable medium of claim 9, wherein the forecasted transportation service revenue is derived based on a difference between a remaining charge amount for ones of the plurality of EVs assigned to provide transportation service before the transportation service and after the transportation service.

11. An apparatus, configured to manage a plurality of autonomous electric vehicles (EVs), a plurality of charging facilities, a power system operation system managing the power system connected to the plurality of charging facilities, and a transportation service system, the apparatus comprising:

a memory configured to receive, through a network interface, parameters from the plurality of electric vehicles (EVs), the plurality of charging facilities, the power system operation system managing the plurality of charging facilities, and the transportation service system, wherein the parameters comprise forecasted transportation service revenue and forecasted operating reserve supply revenue, the forecasted transportation service revenue is calculated based on service revenue per EV electricity consumption and the forecasted operating reserve supply revenue is calculated based on service revenue per operating reserve capacity; and a processor, configured to:
determine EV dispatch instructions for the plurality of EVs, the instructions directing each of the plurality of EVs to conduct one of providing transportation service, charging at one or more of the plurality of charging facilities, and discharging to the one or more of the plurality of charging facilities, the EV dispatch instructions determined from a plurality of candidate dispatch instructions based on an operation value of the plurality of candidate dispatch instructions calculated from transportation service revenue, operating reserve supply revenue, and revenue consumed from EV travel, as determined from the parameters, wherein the revenue consumed from EV travel is calculated based on distance to be travelled by an EV instructed to provide transportation service;

dispatch the EV dispatch instructions to the plurality of EVs;

for receipt of an update of the parameters, adjust the operation value based on the updated parameters, and update the selection of the EV dispatch instructions based on the updated operation value; and autonomously control, based on the determined EV dispatch instructions, the plurality of EVs to perform one of providing transportation service, charging at the one or more of the plurality of charging facilities, and discharging to the one or more of the plurality of charging facilities.

12. The apparatus of claim 11, wherein the EV dispatch instructions are further based on a constraint regarding a maximum number of EVs that can be connected to each of the plurality of facilities, wherein ones of the plurality of EVs assigned to charge or discharge at the one or more the plurality of charging facilities are assigned based on the constraint.

13. The apparatus of claim 11, wherein the processor is further configured to, for the EV dispatch instructions being one of the charging at the one or more of the plurality of charging facilities or the discharging to the one or more of the plurality of charging facilities, dispatch the EV dispatch instructions to the one or more of the plurality of charging facilities to initiate one of charging and discharging of the ones of the plurality of EVs instructed to conduct one of charging and discharging.

14. The apparatus of claim 11, wherein the processor is further configured to: generate the plurality of candidate dispatch instructions; and associate each of the plurality of candidate dispatch instructions with the operation value.

15. The apparatus of claim 14, wherein the forecasted transportation service revenue is derived based on a difference between a remaining charge amount for ones of the plurality of EVs assigned to provide transportation service before the transportation service and after the transportation service.

* * * * *